H. REICHARDT.
Tool for Cutting Pipe.

No. 213,691. Patented Mar. 25, 1879.

UNITED STATES PATENT OFFICE.

HEINRICH REICHARDT, OF COLOGNE, GERMANY.

IMPROVEMENT IN TOOLS FOR CUTTING PIPES.

Specification forming part of Letters Patent No. 213,691, dated March 25, 1879; application filed January 30, 1879.

*To all whom it may concern:*

Be it known that I, HEINRICH REICHARDT, of Cologne, in the Empire of Germany, have invented a new and useful Improvement in Tools for Cutting Pipes and other purposes, of which the following is a full, clear, and exact description, reference being had to the accompanying drawings, forming part of this specification.

This invention relates to tools having rotary shears for cutting metals, in which said shears are adjustable in the plane of their cut; and consists in a tool of such description for severing the ends of pipes and other purposes, composed of duplicate circular cutters, having their cutting-edges in the same plane, adjustable holders for said cutters, a bed-piece, along which said holders are adjustable toward or from one another, and a screw having right and left hand threads, for adjusting the holders and their cutters, substantially as hereinafter described.

Figure 1:
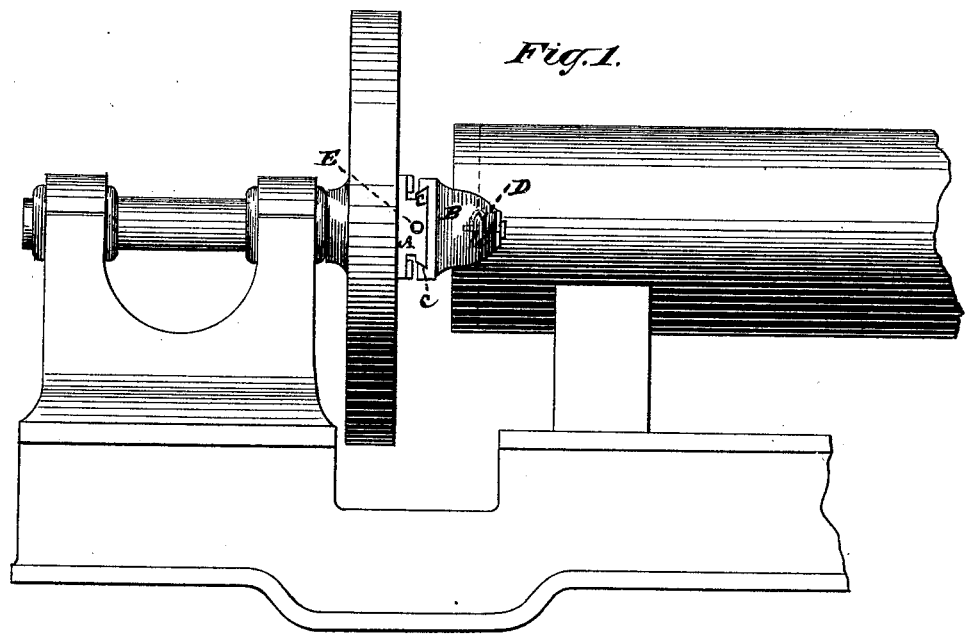
Figure 2:
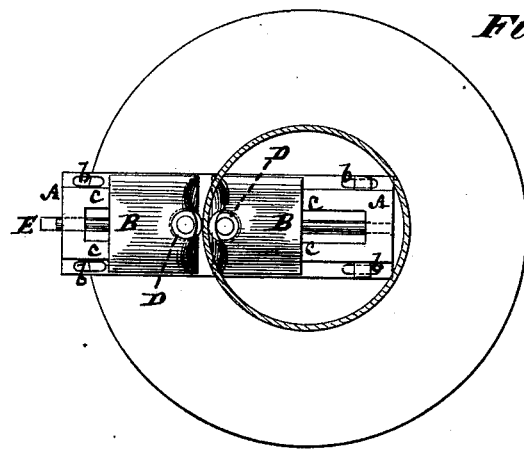
Figure 3:
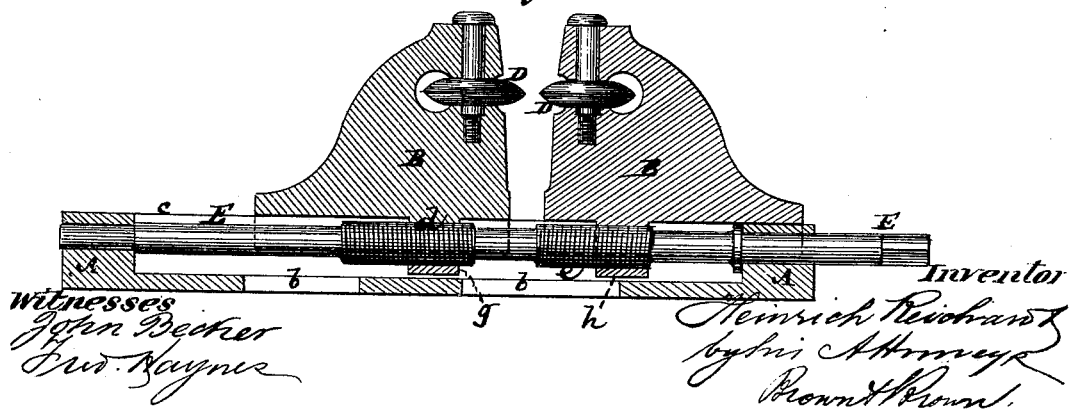

Figure 1 represents an elevation of a turning-lathe, in part, with a piece of pipe in position to be trimmed or reduced at one of its ends by means of my improved cutting-tool, which is secured to the face-plate of the lathe. Fig. 2 is a front view of said face-plate, with the cutting-tool thereon, and the pipe as in the act of being cut in section; and Fig. 3 is a longitudinal section, upon a larger scale, of the improved cutting-tool detached.

A is a stock or bed-piece, having apertures or slots $b$ in its back or base for securing it, by means of bolts, or otherwise, to the face-plate of a lathe or other machine to which it may be applied. Said bed-piece is furthermore constructed with longitudinal ways or guides $c$ $c$ for cutter-holders or supports B B to slide along. These cutter-holders are each fitted with a circular steel cutter, D, arranged to freely rotate about its axis. Said cutters, which may have a knife-edge, have their axes perpendicular to the bed-piece A, and are arranged opposite one another in their respective holders B B, and so that they partly project from or beyond the opposite faces of said holders.

E is a screw, having its bearings in the bed-piece A, and having right and left hand threads $d$ $e$, which, respectively, engage with corresponding threads in screw-boxes $g$ $h$, attached to the inner or base portions of the cutter-holders, so that by turning said screw, which may be done by applying a wrench to one end of it, the cutter-holders B B and their cutters D D are adjusted nearer to or farther from each other, accordingly as the screw is turned to the right or to the left.

To trim or cut off the end of a pipe, the cutting-tool is secured by its slotted or adjustable bed-piece A to the face-plate of a lathe, as shown in Figs. 1 and 2, and so that the cutters D D are arranged at a suitable distance from or to one side of the center of the face-plate, to operate upon the inside and outside surfaces of the pipe, the end of which to be severed is introduced between said cutters.

The centers of the cutters and center of the face-plate or lathe-spindle are in the same plane, and the center of the pipe to be cut is in line with the center of the face-plate.

Said pipe is suitably secured on the lathe-bed, and the cutting-tool rotated by the face-plate, and the cutters D D adjusted by the screw E to bear hard against the inside and outside of the pipe; and after each revolution of the face-plate an additional adjustment of said cutters toward each other is made to complete the incision in the pipe till the end to be severed breaks off.

The bed-piece A, being adjustable on the face-plate, adapts the tool to different-sized pipes.

The same tool may be applied to shaping-machines for cutting plates or trimming the edges thereof by the action of the cutters on opposite sides of the plates.

What I claim as my invention, and desire to secure by Letters Patent, is—

A tool for severing the ends of pipes and other purposes, composed of duplicate circular cutters having their cutting-edges in the same plane, adjustable holders for said cutters, a bed-piece along which said holders are adjustable toward or from one another, and a screw having right and left hand threads for adjusting the holders and their cutters, substantially as specified.

HEINRICH REICHARDT.

Witnesses:
  EMILE BÜRGIN,
  Z. FELURES.